United States Patent [19]

Bienert et al.

[11] 4,118,063
[45] Oct. 3, 1978

[54] VEHICLE TOP WITH PIVOTABLE COVER

[75] Inventors: Horst Bienert, Gauting; Hans Jardin, Krailling, both of Fed. Rep. of Germany

[73] Assignee: Webasto-Werk W. Baier GmbH & Co., Fed. Rep. of Germany

[21] Appl. No.: 794,344

[22] Filed: May 6, 1977

Related U.S. Application Data

[63] Continuation of Ser. No. 622,175, Oct. 14, 1975, abandoned.

[51] Int. Cl.² .................................................. B60j 7/00
[52] U.S. Cl. .................................... 296/137 B; 49/465
[58] Field of Search ............... 296/137 B; 74/424.8 B; 49/463, 465, 324

[56] References Cited

U.S. PATENT DOCUMENTS

| | | | |
|---|---|---|---|
| 459,769 | 9/1891 | Russell | 74/424.8 B |
| 2,950,509 | 8/1960 | Stavanau | 49/324 |
| 3,955,848 | 5/1976 | Lutz | 296/137 B |
| 3,974,753 | 8/1976 | Blomgren | 296/137 B |
| 3,979,148 | 9/1976 | Martin | 296/137 B |

Primary Examiner—Robert R. Song
Attorney, Agent, or Firm—Craig & Antonelli

[57] ABSTRACT

The invention relates to a vehicle top with an opening that can be shut by means of a cover which is provided with a front edge and a rear edge and is fastened, in the area of its front edge, to the top in such a way as to be pivotable about an axis transversal to the longitudinal direction of the vehicle, and which, with its rear edge, can be pivoted out of the top plane upward.

15 Claims, 5 Drawing Figures

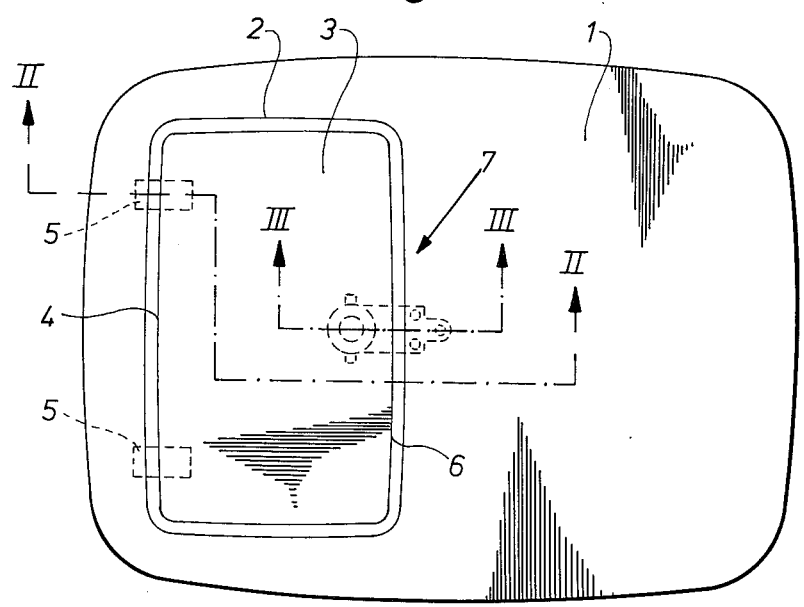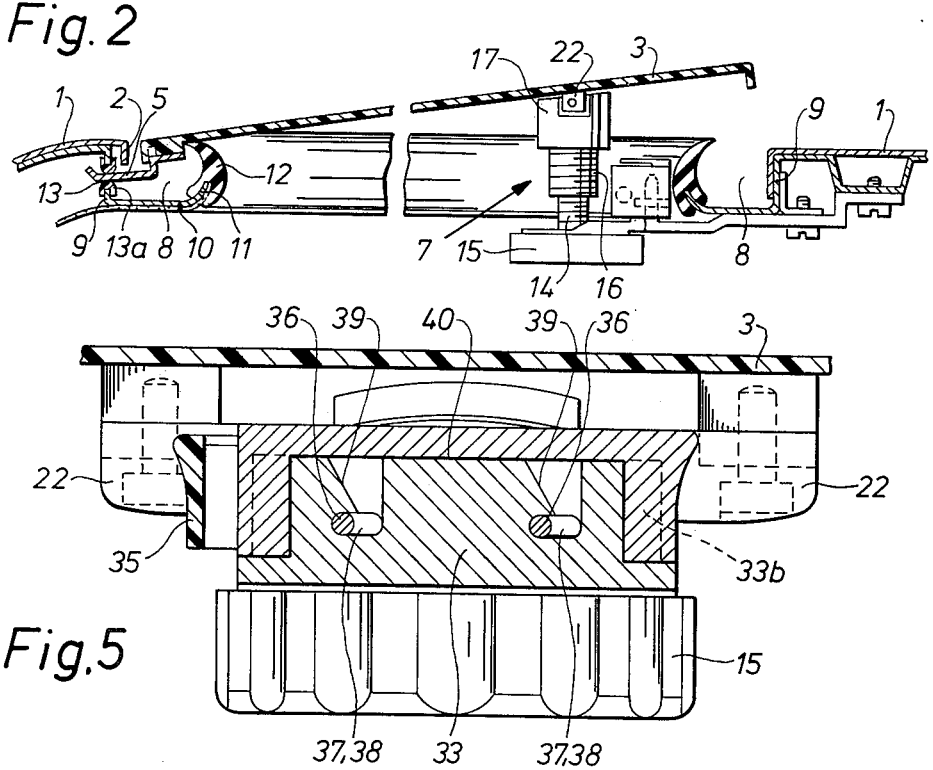

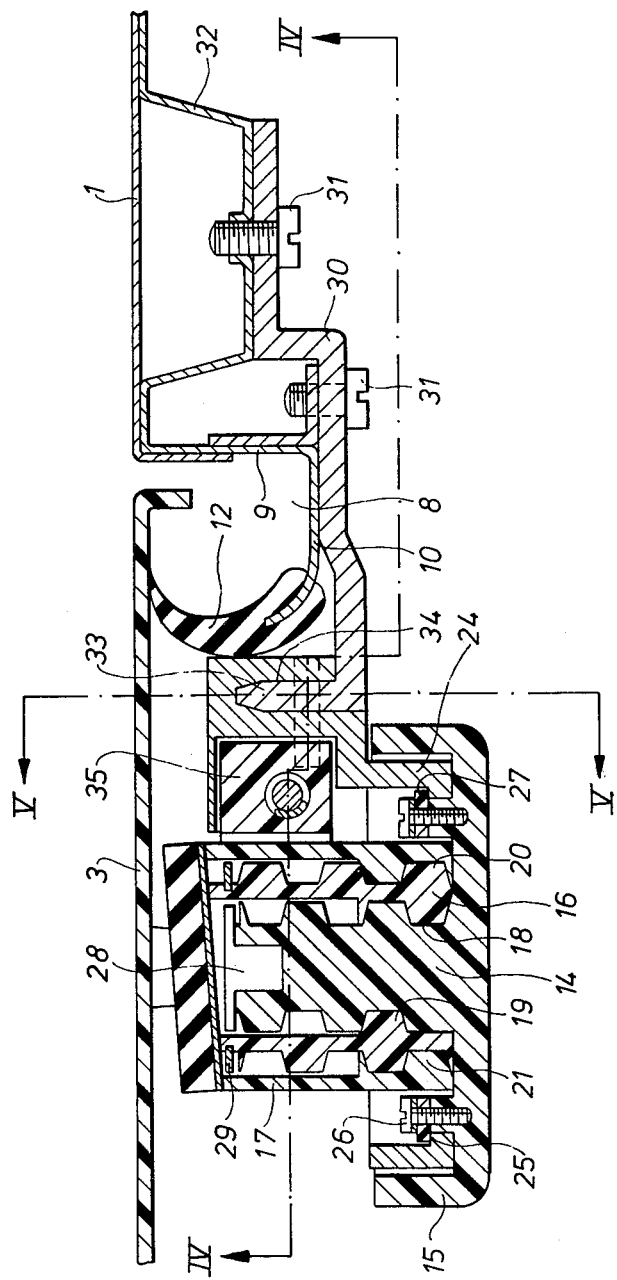

VEHICLE TOP WITH PIVOTABLE COVER

This is a Continuation of application Ser. No. 622,175, filed Oct. 14, 1975 now abandoned.

DESCRIPTION OF THE PRIOR ART

Vehicle tops of this type have already become known in a great variety of embodiments. The known opening devices for the cover, however, are relatively complicated and particularly, require relatively much space, so that they can, to be sure, be employed for the opening of eyelet holes in busses, but not for the opening of pivotable covers in tops of passenger cars where the passengers' heads must be as free as possible and therefore the opening device must require as little space as possible.

SUMMARY OF THE INVENTION

The invention aims at the construction of a vehicle top with a cover that can be pivoted outward and whose opening device consists of few parts, requires little space and besides, permits a safe fixation of the cover in various positions of outward pivoting.

A further purpose of the invention is the construction of a vehicle top with a pivotable cover which can be removed without great effort, so that the top opening remains uncovered.

According to the invention an opening device is provided between the cover in the area of its rear edge and the vehicle top, which opening device consists of a substantially vertical thread element, rotatably fastened to the top, with a handwheel and a counterthread element cooperating with the said thread element, which counterthread element is connected with the cover in a non-rotatable but pivotable manner.

Preferably the opening device consists of a telescopic worm whose parts consist of the thread element, the counterthread element and an intermediate thread element mounted between these two elements. Such an opening device excels by a particularly small space occupied, at a relatively large opening path.

In order to permit removal of the cover, the latter is provided, at its front edge, with projecting connector links which can be slid into slots arranged in a frame section extending from the top opening vertically downward. The thread element of the opening device is pivoted on a support which is provided with a vertical recess open toward the bottom, engaged by a complementary upward directed rib of a support fastened to the vehicle top, which rib is held by a detachable stop. This stop has at least one pin displaceable against spring force, which extends through oblong holes in the support walls limiting the recess, as well as through a corresponding oblong hole provided in the rib of the support, from one end of which oblong hole a V-shaped recess extending to the upper edge of the rib stretches.

In order to achieve a fixation of the rear cover end also in lateral direction, the recess and the rib cooperating therewith are provided with a middle section which extends transversely to the longitudinal direction of the vehicle, and two slanting side section laterally adjacent to the said middle section.

BRIEF DESCRIPTION OF THE DRAWINGS

Further characteristics and details of the invention can be learned from the following descriptiom in connection with the drawings wherein an embodiment of the invention is represented. There is shown in FIG. 1, a plan view upon a motor vehicle top with a cover according to the invention;

FIG. 2, a section along line II—II in FIG. 1, the cover being shown in open position;

FIG. 3, a section along line III—III in FIG. 1 at an enlarged scale, the cover being shown in its closed position;

FIG. 5, a section along V—V in FIG. 3.

DESCRIPTION OF THE PREFERRED EMBODIMENTS

Figure 4:
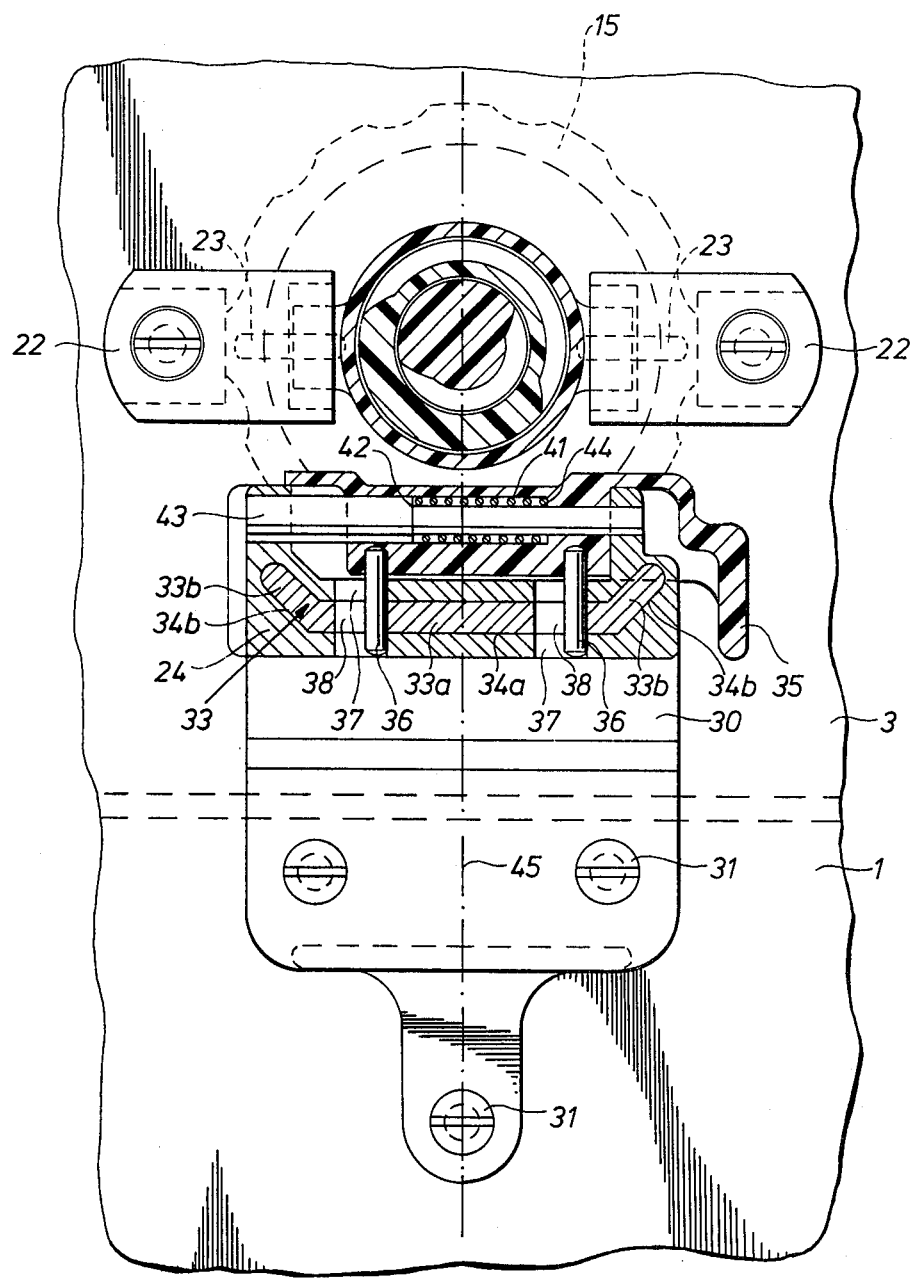
FIG. 4, a section along line IV—IV in FIG. 3.

In FIG. 1, numeral 1 indicates the top of a motor vehicle, especially a passenger car, provided with a top opening 2 which can be shut by means of a cover 3. Cover 3 is provided, along its front edge 4, with projecting connector links 5 which constitute a pivoting connection to be described in greater detail below. In the area of its rear edge 6 the cover is connected via an opening device 7 with top 1.

As shown in FIG. 2, top opening 2 is surrounded by a rain gutter 8 constituted by a frame element 9 which extends from top 1 vertically downward, and a bottom element 10 with a bent-up edge or frame 11 upon which a circular elastic packing 12 is slid. In front edge element 9 two horizontal slots 13 are provided whose length width corresponds approximately to the length of connector links 5 and which are surrounded by elastic packing rings 13a. Connector links 5 are inserted in slots 13, as shown in FIG. 2, and form a hinge for cover 3. Packing rings 13a prevent the water from flowing from rain gutter 8 through slots 13 into the interior of the motor vehicle.

Opening device 7 is provided with a telescopic worm, composed of a thread element fixed with a handwheel 15, an intermediate thread element 16, and a counterthread element 17. Thread element 14 is provided with an external thread 18 engaged by the internal thread 19 of intermediate thread element 16. Intermediate thread element 16 has also an external thread 20 which engages an internal thread 21 of counterthread element 17. Counterthread element 17 is pivotably fastened via two supports 22 (FIG. 4) which are screwed on cover 3 and with which counter thread element 17 is connected via pins 23, to cover 3. Thread element 14 is mounted in a support 24 provided with an annular shoulder 25 by which thread element 14 is supported via a disc 27 of low-friction material, e.g., PTFE (lubricant) screwed on by means of screws 26.

When handwheel 15 is turned in one direction, the counterthread element 17 which is non-rotatably fixed on cover 3, is pushed outward in FIGS. 2 and 3, in which process cover 3 is pivoted outward about the axis of rotation constituted by connector links 5. The degree of the opening can be adjusted in a stepless manner. A pushing out of intermediate thread element 16 from thread 18 of thread element 14 is prevented by a stop 28 provided at the upper end of thread element 14, while a pushing outward of counter thread element 17 from external thread 20 of intermediate thread element 16 is prevented by a stop 29 provided at the end of intermediate thread element 16. When handwheel 15 is turned in the other direction, counter thread element 17 is retracted and cover 3 is brought into its closed position.

To permit complete removal of cover 3, support means is provided comprising a second portion 24 which is detachably connected with vehicle top 1. For this purpose a bracket or first portion 30 is provided which is screwed, by means of screws 31, to top frame 32 and has an upward directed rib 33 which engages a vertical recess 34, open at the bottom, in support or second portion 24. Rib 33 and recess 34 are each provided with a middle section 33a and 34a, respectively, extending transversely to the longitudinal axis 45 of the vehicle, and two laterally adjacent slanting side sections 33b and 34b, respectively. In support 24 a locking element 35 rests in such a way as to be displaceable transversely to the longitudinal vehicle axis 45. It bears two pins 36 which extend through oblong holes 37 in the walls of support 24 which limit recess 34, as well as through corresponding oblong holes 38 provided in rib 33. A V-shaped recess 39 extending to the upper edge 40 of rib 33, stretches from one end of the said oblong hole 38, as is shown in FIG. 5. Locking element 35 is actuated by a spring 41 which rests, on one side on a shoulder 42 of a pin 43 pressed into support or second portion 24, and on the other side on a shoulder 44 on locking element 35 and strives to press locking element 35 in FIG. 4 toward the right, so that pins 36 abut against the end — the left one in FIG. 5 — of oblong holes 38 and establish a positive connection between support or second portion 24 and bracket or first portion 30. When locking element 35 is pressed, against the action of spring 41, toward the left in FIG. 4 and toward the right in FIG. 5, pins 36 enter the area of the V-shaped recesses 39 in rib 33, whereby the support or second portion 24 can be lifted off rib 33 and cover 3 pivoted upward up to such a point where connector links 5 can be extracted from slots 13. When the top is put on again connector links 5 are inserted in slots 13, and when the top is hinged down, the V-shaped recesses 39 facilitate the insertion of pins 36 in the oblong holes 38 of rib 33. In this process locking element 35, due to the slant of recess 39, is pressed, against the action of spring 41, toward the left in FIG. 4 until the pins enter the area of oblong holes 38, whereafter pins 36 can under the action of spring 41 be brought into the locked position shown in the drawing.

The parts of the telescopic worm, i.e., elements 14, 16, and 17 are preferably of plastic material, while support or second portion 24 and bracket or first portion 30 consist preferably of metal.

We claim:

1. A vehicle top with an opening having a front and a rear edge, an open frame surrounding said opening, a cover having a smooth fit in said frame and having a forward edge and a rear edge, a pivotal connection between the forward edge of said cover and said frame, near the front edge thereof, a multi-part expansible opening device adjacent the rear edge of said cover, means connecting a first part of said device to said cover for pivoting about a transverse axis, said first part including an internally threaded element, a second part of said device including an externally threaded element, a third tubular part having external and internal threads engaged respectively with the threads of said first and second parts and a support means mounting said second part, a first portion of said support means mounting said second part, a first portion of said support means being mounted to said frame near the rear edge of said opening.

2. The invention of claim 1, a handwheel fixed with said second part, means journaling said handwheel on a second portion of said support means for rotation about the common, essentially vertical axis of said parts, rotation of said handwheel in a respective one of two directions expanding and contracting said opening device to effect corresponding pivoting of said cover about said pivotal connection.

3. The invention of claim 2, said first portion fixed with said frame at the rearward edge thereof and removably supporting said second portion of said support means, said first portion comprising an upwardly-directed rib, said second portion of said support means having a downwardly-facing recess slidably fitting over said rib, and manually-operable means releasably securing said second portion of said support means and parts carried thereby, in an operative position with respect to said cover.

4. The invention of claim 3, said manually operable means comprising a locking element mounted to said second portion of said support means for transverse translation parallel with said cover, first and second laterally-spaced pins fixed with said locking element, there being transverse oblong holes in said second portion of said support means, there also being first and second vertically-disposed undercut slots in said rib, opening through the top thereof and spaced to register with said holes, each said pin riding downwardly in a respective one of said undercut slots as said recess moves downwardly over said rib, and spring means continuously urging said locking element in a direction to move each said pin into a respective undercut portion of its slot, when said second portion of said support means moves into operative downward limiting position on and with respect to said rib.

5. The invention of claim 3, said rib having an essentially planar central area and vertical side edges bent forwardly out of the plane of said central area, the recess in said second portion of said support means being correspondingly shaped for a smooth fit over and about said rib.

6. The invention of claim 4, the undercut slots in said rib having one side of each sloping upwardly and transversely outwardly from the undercuts therein, said sloping sides being constructed and arranged to cam said pins and locking element transversely against the urge of said spring means, as said portion of said support means moves downwardly on and over said rib.

7. The invention of claim 2, said second portion of said support means including an integral horizontally-disposed inwardly-flanged first annulus, said journaling means comprising a second annulus of low friction plastic secured to said handwheel and rotatably engaging the flange of said first annulus, to thereby confine said handwheel to rotation about said common vertical axis.

8. The invention of claim 1, said frame including a continuous integral inwardly-extending rain gutter having its inward edge bent upwardly, and a sealing ring of elastic material frictionally fitting over and about the inward edge of said gutter, for yielding contact with the under side of said cover when the latter is fully closed, and said opening device being positioned inside the space surrounded by said ring.

9. The invention of claim 1, said frame including a vertically downwardly-extending flange along its forward edge, there being first and second laterally-spaced slots in said flange, and first and second links forwardly projecting from the forward edge of said cover, each said link being adapted for a sliding pivotal fit in a respective one of said slots.

10. A vehicle top with an opening having a front and a rear edge, an open frame surrounding said opening, a cover having a forward edge and a rear edge, a pivotal connection between the forward edge of said cover and said frame, near the front edge thereof, an expansible opening device adjacent the rear edge of said cover, said device connected between said rear edge and the frame near the rear of said opening, and being operable to pivot said cover about a transverse axis to and from a first position within said frame and a second position wherein said rear edge is arcuately displaced above said frame, wherein said expansible opening device comprises a first part connected to said cover and including an internally threaded element, a second part including an externally threaded element, a third tubular part having external and internal threads respectively engaged with the threads of said first and second parts, and a support means mounting said second portion to said frame near the rear edge of said opening.

11. The vehicle top according to claim 10, wherein a handwheel is joined to said second part and journaled on said supporting means for rotation about an essentially vertical axis to expand and contract said opening device and effect a pivotal movement of said cover about said pivotal connection between said first and second positions.

12. The vehicle top according to claim 11, wherein said support means includes an integral horizontally-disposed inwardly-flanged first annulus, said second part is journaled by journaling means comprising a second annulus of low friction plastic secured to said handwheel and rotatably engaging the flange of said first annulus, to thereby confine said handwheel to rotation about a common vertical axis.

13. The vehicle top according to claim 10, wherein said frame includes a continuous integral inwardly-extending rain gutter having an inward edge bent upwardly, and a sealing ring of elastic material frictionally fitting over and about the inward edge of said gutter, for yielding contact with the under side of said cover when the latter is fully closed, and said opening device being positioned inside the space surrounded by said ring.

14. The vehicle top according to claim 10, wherein said pivotal connection includes a vertically downwardly-extending flange along the forward edge of said frame, there being first and second laterally spaced slots in said flange, and first and second links forwardly projecting from the forward edge of said cover, each said link being adapted for a sliding pivotal fit in a respective one of said slots.

15. The vehicle top according to claim 14, wherein said links and said support means are detachably connected to said frame so as to enable complete removal of said cover in addition to said pivotal movement between said first and second positions.

* * * * *